United States Patent [19]
Bradbury

[11] Patent Number: 5,640,933
[45] Date of Patent: Jun. 24, 1997

[54] ANIMAL GROOMING CHUTE

[76] Inventor: Ernest Kenneth Bradbury, 2480 Bradbury Rd., Haines City, Fla. 33844

[21] Appl. No.: 572,744

[22] Filed: Dec. 14, 1995

[51] Int. Cl.⁶ .................................................. A01K 29/00
[52] U.S. Cl. ............................................................ 119/735
[58] Field of Search ........................................ 119/723, 729, 119/732, 735, 738, 744, 751, 752

[56] References Cited

U.S. PATENT DOCUMENTS

| | | | |
|---|---|---|---|
| 3,451,377 | 6/1969 | Hart et al. | 119/751 |
| 3,766,890 | 10/1973 | Baker | 119/96 |
| 4,201,158 | 5/1980 | Parker | 119/98 |
| 4,432,305 | 2/1984 | Vernese | 119/752 |
| 4,470,372 | 9/1984 | Norman | 119/27 |

*Primary Examiner*—Thomas Price
*Attorney, Agent, or Firm*—Joseph H. McGlynn

[57] ABSTRACT

A restraining chute for various types of livestock in the form of a parallelpiped frame, having side kick safety panels, a back gate, and an adjustable head catch. The safety panels are secured to longitudinal rails by releasable locking handles, which allow the panels to be moved along the rail and secured in place. The panels serve to prevent injury from the kick of the animal both before and after the animal is secured in the chute. The head catch is adjustable, consisting of two pivotal arms which can be pulled to secure the neck of the animal between the vertical pivot arm and the frame of the chute. Notches on the horizontal pivot arm fit onto a stationary peg mounted to the chute frame, allowing the head catch to be secured in place and properly adjusted. The animal is thus secured without complex restraints that tend to obstruct grooming and washing. A back gate on the chute enhances the safety of the user by preventing the animal from exiting the chute before it is fully secured therein.

3 Claims, 1 Drawing Sheet

ANIMAL GROOMING CHUTE

BACKGROUND OF THE INVENTION

The present invention relates generally to a device for restraining animals, and particularly to a chute designed to safely hold livestock for the purposes of grooming and the like.

DESCRIPTION OF THE PRIOR ART

Owners of livestock often find it necessary to restrain their animals while performing various tasks, and the prior art discloses several inventions designed to meet this need. For example, U.S. Pat. No. 3,451,377 describes a leg restraint used to prevent cows from kicking while housed in their stalls. U.S. Pat. Nos. 4,470,372 and 3,766,890 disclose devices which immobilize livestock by applying restraint to the back of the animal. Various types of chutes have also been proposed, such as the horse chute disclosed in U.S. Pat. No. 4,201,158, which features a safety latch to prevent the animal from injuring itself.

However, the restraint devices heretofore disclosed generally do not accommodate a wide range of different animals. Most require the attachment of complex devices to the body of the animal, which are designed primarily to fit only one species and which can interfere with grooming and washing. Moreover, the owner of the animal is vulnerable to kicking and other dangerous movements before the animal is fully secured.

SUMMARY OF THE INVENTION

The present invention is a restraining chute for various types of livestock, comprising a parallelpiped frame with movable side safety panels, a back gate, and a head catch. The invention provides a restraint device that enhances the safety of the user and provides unobstructed access to the animal's coat for the purposes of grooming, washing, and the like.

The chute can be constructed from wood or metal, and is large enough to contain horses and other large livestock. Two kick panels are mounted to longitudinal side rails by means of releasable lock handles. These panels can be moved along the rails to provide maximum safety from the kick of the animal while it is entering the chute and after it is restrained by the head catch. The invention also features a back gate to prevent the animal from backing out of the chute before it is secured therein.

The head catch, mounted at the front of the chute, consists of a generally vertical arm pivotally attached at its bottom end to a horizontal frame member, and pivotally attached at its other end to a horizontal notched arm. The notched arm has a handle at one end which is pulled, causing the neck of the animal to be secured between the vertical pivot arm and a stationary vertical cross bar. The stationary cross bar contains a pin projecting therefrom, which fits into the openings of the notched arm, thereby securing the vertical pivot arm in place. The head catch can thus be adjusted to accommodate different sizes of animals, and can be secured quickly and easily.

When the animal is secured in the chute, its coat is fully exposed and unobstructed by any type of complex bodily restraint. Therefore, the user has unimpeded access to the animal for the purposes of grooming and similar tasks, while he is also protected from the animal's kick by the safety panels.

It is an object of the present invention to provide an improved animal restraint.

It is an object of the present invention to provide an animal restraint which can accommodate a range of different animal types.

It is an object of the present invention to provide an animal restraint which enhances the safety of the user by preventing injury from the animal's kick, and by preventing the animal from backing out of the restraint before it is fully secured therein.

It is an object of the present invention to provide an animal restraint which enhances the user's ability to groom and wash the animal by providing unobstructed access to the animal's coat.

It is an object of the present invention to provide an animal restraint in the form of a chute, comprising a parallelpiped frame with movable side safety panels, a back gate, and an adjustable head catch.

These and other objects and advantages of the present invention will become fully apparent from the detailed description below, when taken in conjunction with the annexed drawings.

DESCRIPTION OF THE PREFERRED EMBODIMENT

Figure 1:
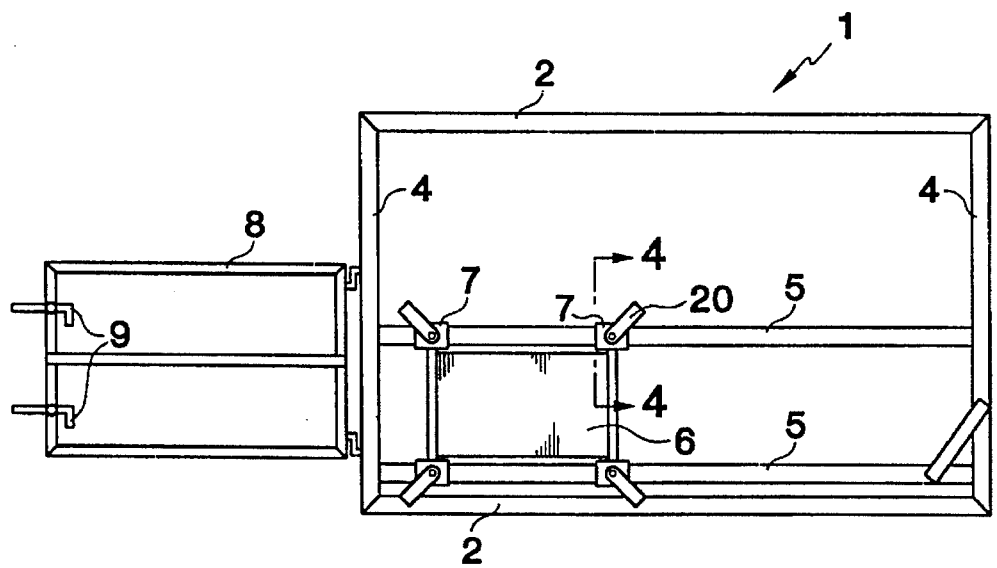
FIG. 1 is a side view of the invention.
Figure 2:
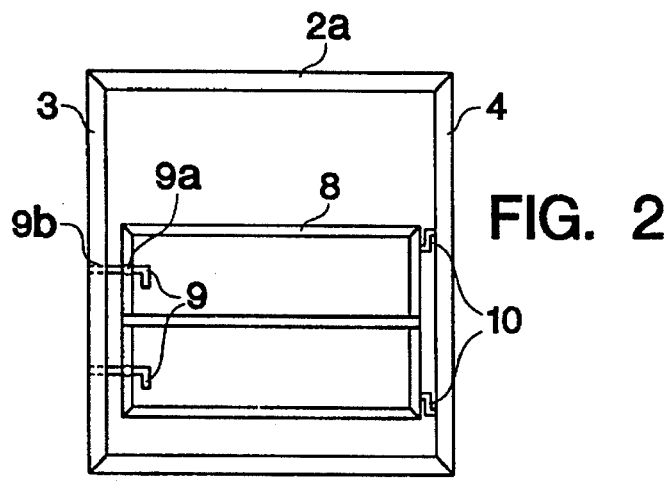
FIG. 2 is a back view of the present invention.
Figure 4:
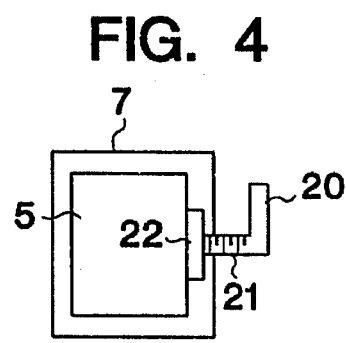
FIG. 4 is a cross-sectional view of the releasable lockn mechanism.
Figure 3:
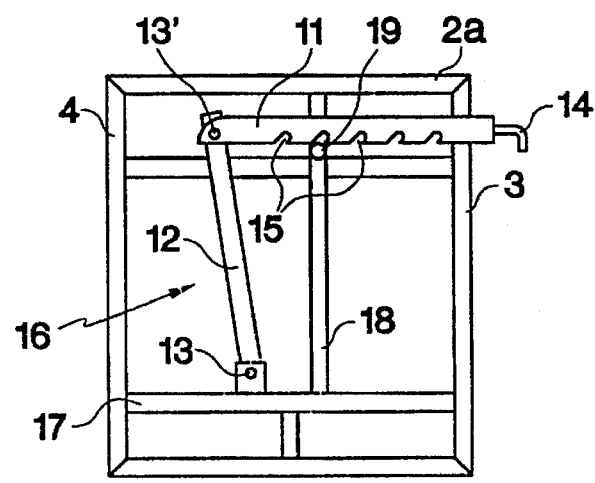
FIG. 3 is a front view of the present invention.

Referring now to the drawings, as shown in FIG. 1 the invention 1 is a chute, with a gate 8 in the open position, in the form of a parallelpiped frame, having substantially rectangular top, bottom, and end faces, defined by upright corner posts 3, 4, longitudinal members 2, and transverse frame members 2a (see FIGS. 2 and 3). The chute is of a size sufficient to accommodate various types of large livestock, and may be constructed of, but not limited to, wood or metal.

As shown in FIG. 1, rails 5 extend longitudinally on either side of the frame, connecting at their ends to the corner posts 3, 4. Attached to the rails 5 by means of lock handles 7 are kick guards 6, consisting of rectangular, planar pieces of wood or metal. At each corner, the kick guards 6 are permanently attached to releasable locking handles 7, which, when turned, apply pressure to the rails 5 and secure the kick guards 6 in place. When released, the lock handles 7 allow the kick guard 6 to be moved along the rails 5.

Different types of releasable lock mechanisms could be employed to secure the kick guards 6 to the rails 5. The preferred type of lock device would consist of a vise-type mechanism, with a threaded member 21 extending through the corner of the kick guard 6 and attaching at its end to a pressure plate 22. The threaded member could be turned by means of a handle 20, tightening the pressure plate to the rail 5.

FIG. 2 shows the invention from the back, wherein a back gate 8 is shown attached to the upright frame member 4 by means of hinges 10. The gate 8 contains closures 9 on the opposite side for the purpose of securing the gate. The closures 9 are shown in FIG. 2 as generally L-shaped pieces attached to the gate 8 by semi-circular rings 9a, through which the closures 9 can be slid and inserted into openings 9b on the upright frame member 3. Of course, many different types of gate closures are known and could be used; the type of closure shown in FIG. 2 is preferable, however, for its simplicity and ease of use. The back gate adds a measure of safety to the invention by preventing the animal from escaping the chute before it is secured by the head catch 16 described below.

FIG. 3 shows the invention 1 from the front, where the invention features a head catch 16 to secure the animal in the chute. The head catch 16 consists of an upright arm or first bar 12 pivotally attached at its bottom end to horizontal frame member 17 by means of a pin hinge 13, and pivotally attached by a similar pin 13' at its top end to transverse arm or second bar 11. Transverse arm 11 has at one end a handle 14 and contains a series of notched openings 15 along its bottom edge.

As shown in FIG. 3, secure vertical frame member 18 extends between the horizontal frame member 17 and upper transverse frame member 2a. A pin 19, projecting through the vertical frame member 18, fits into the notched openings 15 on the transverse arm 11 of the head catch 16. When the handle 14 is pulled, the vertical pivot arm 12 is moved towards the stationary vertical frame member 18. The neck of the animal is placed between the vertical pivot arm 12 and the vertical frame member 18, and the space between the arm 12 and the frame 18 is closed by pulling the handle 14 until the animal's neck is secured therein. The transverse arm 11 is secured by fitting the appropriate notch 15 over the pin 19 on the vertical frame member 18, thus holding the head catch 16 in place.

When used, the invention provides enhanced security by preventing injuries from kicking and by preventing the animal from backing out of the chute before it is restrained. The kick panels 6 can be moved alongside the animal as it is directed towards the head catch 16, and can then be secured in place when the animal is properly restrained. The head catch 16 is adjustable, so it can accommodate different sizes and types of animals. Moreover, the head catch 16 presents the user with only a minimal amount of obstruction of the animal's coat, allowing for easier grooming and washing.

Although the grooming chute and the method of using the same according to the present invention have been described in the foregoing specification with considerable detail, it is to be understood that modifications may be made to the invention which do not exceed the scope of the appended claims and modified forms of the present invention done by others skilled in the art to which the invention pertains will be considered infringements of the invention when those modified forms fall within the claimed scope of the invention.

What I claim as my invention is:

1. An animal grooming chute comprising:

a front frame, a back frame, and a pair of side frames, a gate attached to one side of said back frame and detachably secured to another side of said back frame, animal head restraint means attached to said front frame, a sliding panel, a means for movably attaching said sliding panel along a entire length of at least one of said side frames.

2. The animal grooming chute as claimed in claim 1, wherein said animal head restraint means comprises a first bar pivotably attached to said front frame, a second bar pivotably attached to said first bar, means on said second bar for securing said first and second bars in one of a plurality of positions, a vertical frame member attached at a top and a bottom of said front frame, whereby an animal's head is adapted to be placed between said vertical frame member and said first bar, and held therein by said means on said bar for securing said first and second bar in one of a plurality of positions.

3. The animal grooming chute as claimed in claim 1, wherein said sliding panel has means for securing said sliding panel in a plurality of positions along at least one of said pair of side frames.

\* \* \* \* \*